United States Patent [19]

Woodruff

[11] Patent Number: 4,558,770

[45] Date of Patent: Dec. 17, 1985

[54] FREEWHEEL UNIT

[75] Inventor: Frank Woodruff, New Hartford, N.Y.

[73] Assignee: Allied Corporation, Morris Township, Morris County, N.J.

[21] Appl. No.: 492,866

[22] Filed: May 9, 1983

[51] Int. Cl.⁴ .............................................. F16D 47/04
[52] U.S. Cl. ................................. 192/48.6; 192/67 A; 192/94
[58] Field of Search ............ 192/48.6, 94 (U.S. only), 192/34, 35, 67 A, 53 H, 54

[56] References Cited

U.S. PATENT DOCUMENTS

| | | | |
|---|---|---|---|
| 949,179 | 2/1910 | Gilbert | 192/94 |
| 1,376,033 | 4/1921 | Page | 192/54 |
| 1,862,188 | 6/1932 | Legge | 192/48.6 |
| 1,936,542 | 7/1930 | Nardone | 192/48.6 |
| 2,844,238 | 3/1955 | Peterson | 192/94 |
| 4,253,557 | 3/1981 | Bunger | 192/94 |

FOREIGN PATENT DOCUMENTS 2246197  3/1974  Fed. Rep. of Germany ........ 192/94

*Primary Examiner*—Rodney H. Bonck
*Assistant Examiner*—Richard M. Lorence
*Attorney, Agent, or Firm*—Thomas Adams; Stanley N. Protigal

[57] ABSTRACT

A unit can transmit driving torque from an input (32; 100) to an output (20; 118) shaft in a given rotational sense. Load torque of the same rotational sense, at the output shaft (20; 118), can cause that shaft to freewheel. The unit has a rotor (34; 104) arranged to be driven by the input shaft (32; 100). Also included is a hub (54; 132) coupled to the output shaft (20; 118) to rotate therewith. The unit also has a thrust device (46; 138). This thrust device (46; 138) is threadably and coaxially mounted on the rotor (34; 104) for running on the rotor (34; 104) and engaging the hub (54; 132).

7 Claims, 9 Drawing Figures

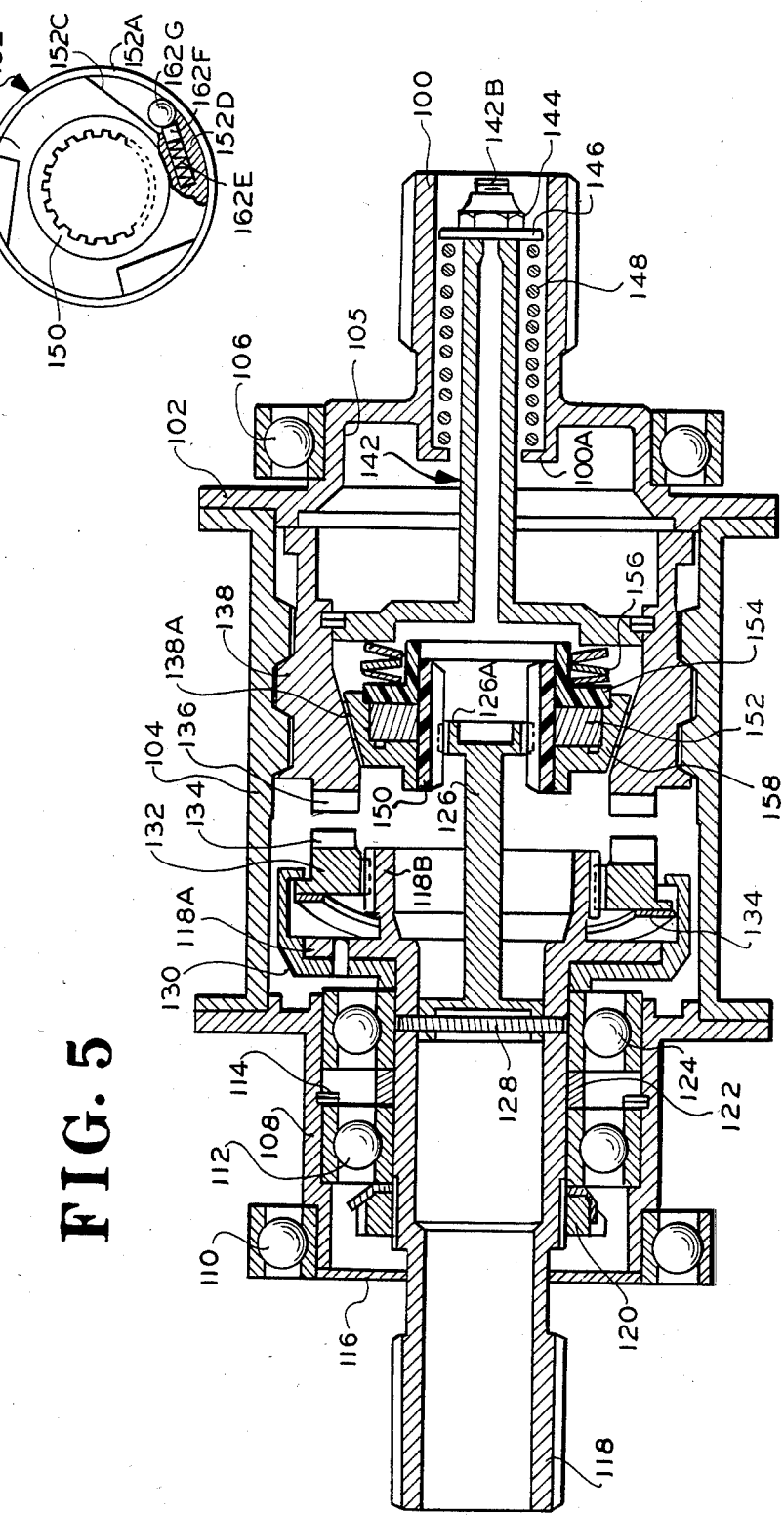

FREEWHEEL UNIT

BACKGROUND OF THE INVENTION

The present invention relates to units that can freewheel and, in particular, to units for transmitting torque in one sense, but yet allowing a freewheeling in the event that the output speed tends to exceed the input speed.

In the helicopter art it is known to drive a helicopter blade through a freewheel unit that includes a sprag clutch. Known sprag clutches include a plurality of peripheral cam-like members. Rotation in one direction tends to drive the cam-like members into a tangential position. Rotation in the opposite direction tends to align the cam-like members radially, thereby locking inside and outside hubs to allow torque transmission.

It is also known to transmit torque in a single direction by means of a well-known ratchet. Other existing unidirectional devices include a roller clutch having a plurality of cylindrical rollers disposed around the periphery of the clutch. Each roller is located on a ramp and is spring biased on the ramp. Rotation in one direction tends to drive the roller along the ramp so that interference does not occur. However, rotation in the opposite direction tends to cause the roller to ride up the ramp so that coupling occurs between the inside and outside hub, thereby allowing torque transmission.

Another known unidirectional torque coupler is a spring wrap clutch. This clutch is essentially a spring-like member which can be wound around or inside two hollow, spaced, coaxial members. When the driving member is spinning in a direction to "unwrap" the spring clutch, substantially no torque is transmitted. Rotation of the driving member in the opposite direction tends to wind the spring tightly about the driving and driven members thereby causing torque transmission.

A disadvantage with the foregoing types of freewheeling units is that they inherently rely on a frictional effect or the high vibrational ratcheting effect to cause selective torque transmission. Accordingly, there is a tendency for high wear.

Accordingly, there is a need for a freewheel unit which can allow torque transmission in one direction and also provide positive coupling in a small and reliable package.

SUMMARY OF THE INVENTION

In accordance with the illustrative embodiments demonstrating the features and advantages of the present invention, there is provided a unit for transmitting driving torque from an input to an output shaft in a given rotational sense. Load torque of the same rotational sense at the output shaft can cause the output shaft to freewheel. The unit has a rotor arranged to be driven by the input shaft. The unit also has a hub coupled to the output shaft to rotate therewith. Also included is a thrust means threadably and coaxially mounted on the rotor for running on the rotor and engaging the hub.

A disclosed method according to the principles of the same invention can result in the driving of a shaft at a drive speed, or a faster freewheeling speed, with a pair of threadably connected, telescoping members. The method includes the step of applying a torque in a given direction through the members. Another step is resisting rotation of a predetermined one of the members, causing it to telescope and engage the shaft.

By employing apparatus and methods of the foregoing type, an improved freewheeling technique is provided. In a preferred embodiment, a rotor has internal helical splines which are driven by the input shaft. A telescoping annular member within the rotor matches its splines. The output shaft is coupled through a frictional device to the inside annular member to resist its rotation and allow the annular member to threadably telescope within the rotor.

In a preferred embodiment, the frictional device has a collar rotatably mounted on the output shaft. There is preferably a spring wrap clutch connected between the output shaft and the collar. Furthermore, a frictional clutch is connected between the collar to the telescoping annular member. Consequently, during startup, the inside annular member does not tend to turn in synchronism with the rotor. Therefore, the rotor and its annular member telescope. This telescoping action drives teeth on the annular member into corresponding teeth coupled to the output shaft. Once coupled, a positive connection is created between the input and output shafts allowing for a high torque transmission.

Also, the seating between these opposing teeth is facilitated by the previously described frictional clutch and unidirectional clutch. The lead of the helical splines is able to fully seat these teeth because of the slippage permitted by the frictional clutch. This feature prevents the teeth from locking only at their tips to prevent reliable transmission of high torque.

Preferably, when the torque at the output shaft reverses, either because the input shaft decelerates or the output shaft rises to a speed exceeding the input shaft, freewheeling can occur. In a preferred embodiment, the reversal of torque removes the restraining torque otherwise applied through the unidirectional clutch. Then due to the force provided by an internal compression spring, and the force due to the backside of the teeth, the rotor and its annular member telescopically collapse. This removes the positive coupling between the input and output shaft allowing the latter to rotate at a higher speed, or to freewheel.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings wherein:

FIG. 5 is a longitudinal, cross-sectional view of a unit which is an alternate to that shown in FIG. 1;

FIG. 6 is a detailed end view of the unidirectional clutch of the unit of FIG. 5;

DETAILED DESCRIPTION OF PREFERRED EMBODIMENTS

Figure 1:
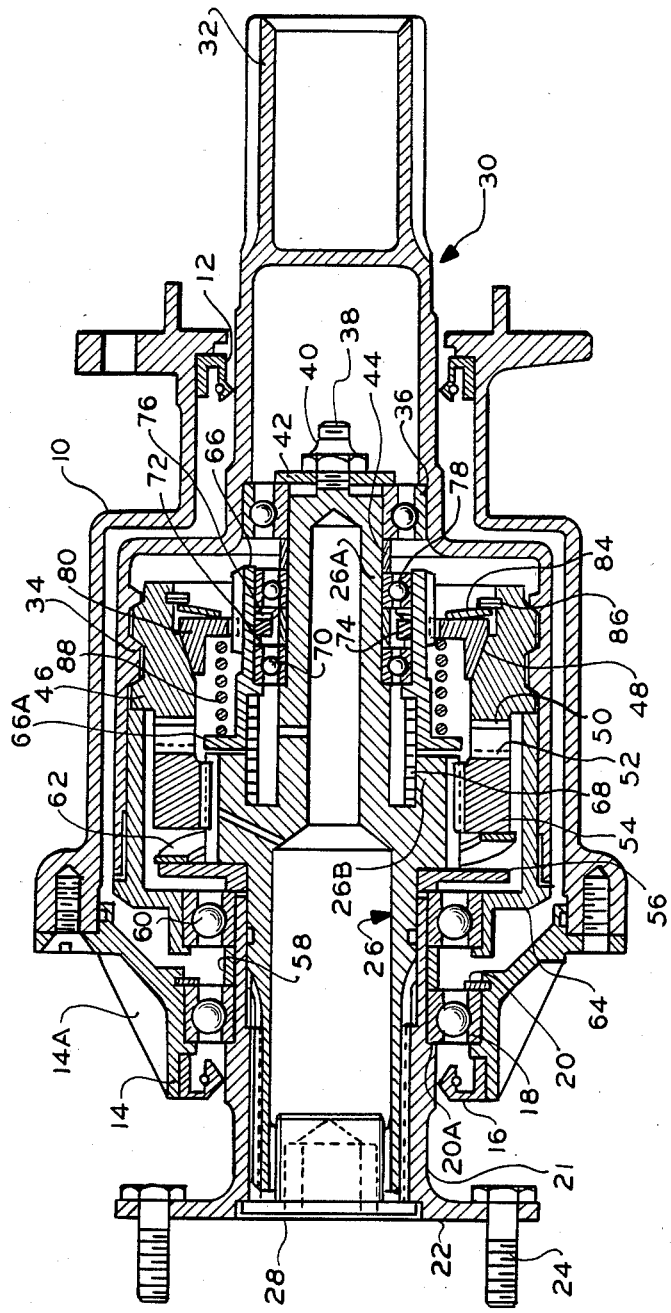
FIG. 1 is a longitudinal, cross-sectional view of a unit according to the principles of the present invention.
Figure 2:
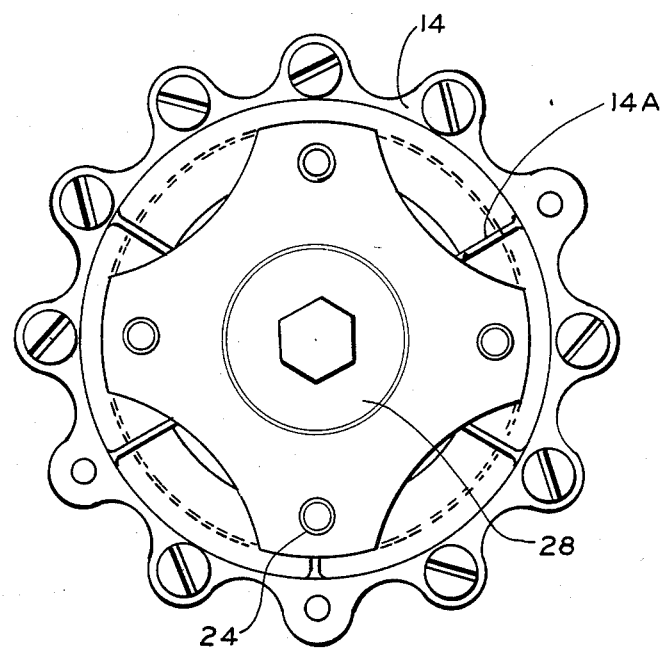
FIG. 2 is a view of the output end of the unit of FIG. 1.

Referring to FIGS. 1 and 2, a unit is shown employing a housing 10 in the shape of a cylindrical cannister having a neck portion into which an annular grease seal 12 is mounted. Affixed by screws on the opposite end of housing 10 is an open cover 14 having radial ribs 14A. Cover 14 supports another annular, internal grease seal 16. Mounted within the neck of cover 14 inwardly of grease seal 16 is ball bearing 18 which rotatably supports a hollow output shaft 20. Shaft 20 terminates in a four-pronged flange 22 through which bolts 24 may be inserted to connect to another shaft (not shown). Bearing 18 is held in place by a snap ring 21 fitting into a complementary internal groove of cover 14. Output shaft 20 has internal splines which mate with external splines on the outer end of support shaft 26. Between the outer end and the smaller unsplined inner end of shaft 26 is an inwardly projecting shoulder and eave 26B having external splines. Output shaft 20 is secured by socket screw 28 which is threaded into the hollow outer end of support shaft 26.

A combined input shaft and rotor is shown herein as element 30 having an outer, externally splined, hollow input shaft 32. The inward end of element 30 widens into the larger cylindrical rotor 34 having internal helical splines. Ball bearing 36 is coupled around the inside tip of support shaft 26A and within the juncture between hollow rotor 34 and the balance of element 30. The inner end of support shaft 26A terminates in threaded stud 38 onto which are secured nut 40 and washer 42 to inwardly drive ball bearing 36 against spacer 44. Threadably and coaxially mounted within the splines of rotor 34 is annulus 46, an element having an internal, bevelled surface 48 which diverges in a direction towards input shaft 32. The splines of elements 46 and 54 have a relatively high lead; in one embodiment a 3 inch lead was used on splines having approximately a 2.7 inch diameter. On the output side of annulus 46 projecting toward the left (this view) are a plurality of driving teeth 50 whose center lines are radially aligned. These teeth are shown engaging driven teeth 52 of toothed member 54 which is referred to herein as a hub. The teeth are of a "saw-tooth" form. Hub 54 is an annular member having internal splines which engage external splines on the shoulder and eave 26B of support shaft 26.

Spacer 58 on input shaft 20 separates the ball bearings around shaft 20, outer bearing 18 and inner bearing 60. Bearings 60, 18 and spacer 58 are pressed against shoulder 20A of shaft 20 by shoulder 26B through flanged washer 56. Compressed between the inside face of washer 56 and annular hub 54 is wave-type washer 62 which tends to separate washer 56 and hub 54 and drive teeth 52 toward teeth 50. Bearing 60 rotatably supports the neck at one end of cylindrical retainer 64 whose other end is threaded within hub 34 to act as a stop for the annulus 46. Effectively, rotor 34 is rotatably supported at opposite ends by bearings 36 and 60 which are mounted around the combination of shaft 26 and 20.

The illustrated drag means includes a collar 66 having radially flanged end 66A. Located within collar 66 and shoulder and eave 26B is wrap spring clutch 68, in the form of a helical coil. Torques tending to wind (or tighten) clutch 68 cause it to contract so that virtually no coupling occurs between collar 66 and shoulder and eave 26B. Reverse twisting causes wrap spring clutch 68 to unwrap (or expand) and tightly couple to both collar 66 and shoulder and eave 26B. Separated from wrap spring clutch 68 by an internal ridge of collar 66 and rotatably supporting the collar is ball bearing 70 which is mounted upon support shaft 26A. Ball bearing 70 is held into place by snap ring 72 which fits into an internal groove of collar 66. Spacer 74 is positioned between snap ring 72 and wave-type washer 76 which also bears against another ball bearing 78 spanning collar 66 and support shaft 26A. Previously mentioned spacer 44 separates ball bearings 78 and 36. The end of collar 66 adjacent bearing 78 has external splines which engage internal splines on a frictional means, shown herein as an annular clutch 80 having a channel-like cross section and an outer bevelled surface matching surface 48. Clutch member 80 is urged against annulus 46 by a resilient means, shown herein as Belleville-type washer 84 held in place by snap rings 86 which fit into an internal groove on the input (right) end of annulus 46.

A compression spring 88 is trapped between the flange 66A and the clutch member 80. Being positioned in this fashion, the spring 88 tends to separate the teeth 50 and 52.

Figure 3:
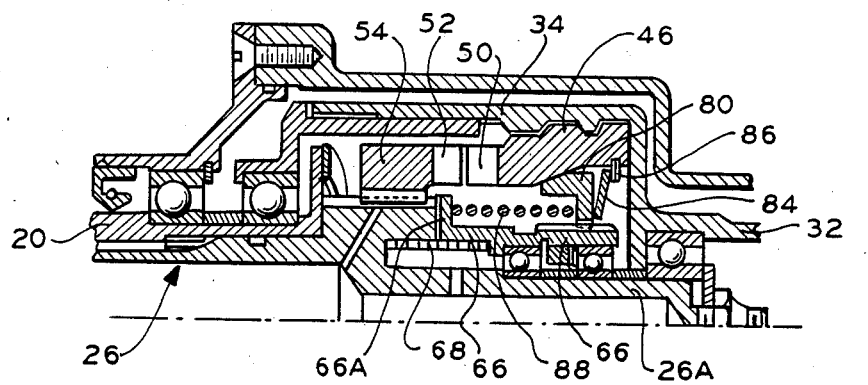
FIG. 3 is a detail of a portion of the apparatus of FIG. 1 showing some of its components axially shifted during a freewheeling operation.
Figure 4:
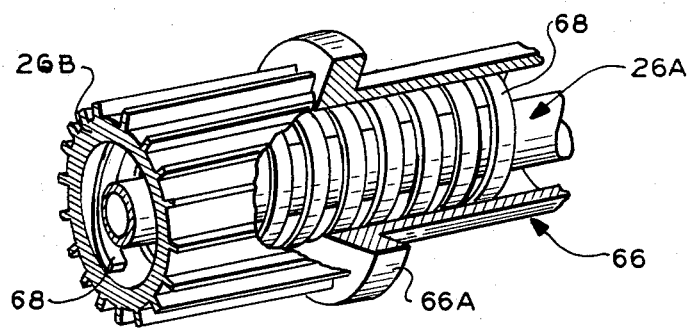
FIG. 4 is a perspective view of the spring wrap clutch, including its driving and driven elements, from the apparatus of FIG. 1.

Referring to FIG. 4, the previously mentioned support shaft 26 is shown in this fragmentary perspective view with its inner shaft end 26A coaxially located within the shoulder and eave section 26B. Adjacent to section 26B is the collar 66 having flange 66A. Mounted within both element 26B and collar 66 is wrap spring clutch 68. As previously mentioned, the force tending to unwind (wind) wrap spring clutch 68 will tend to tighten (untighten) its hold on elements 66 and 26B. For example, should element 26B turn in a clockwise direction with respect to collar 66, wrap spring clutch 68 tends to unwrap, thereby tightly coupling collar 66 and eave 26B. An example of the type of wrap spring clutch usable in this apparatus is that produced by Warner Electric, Beloit Ill. To facilitate an understanding of the principles associated with the apparatus in FIGS. 1–4, its operation will be briefly described. It will be assumed initially that the apparatus in FIG. 1 is quiescent. As shown in FIG. 3, compression spring 88 presses annular clutch 80 to the right, thereby applying a force through Belleville spring 84 and snap ring 86 to annulus 46. The lead of the splines of annulus 46 is such that it readily rotates and translates along its splines to the position illustrated in FIG. 3. Consequently, teeth 50 and 52 are disengaged.

It will now be assumed that input shaft 32 accelerates in a clockwise direction (when viewing from input toward output), so that rotor 34 spins clockwise. The shafts 20 and 26 initially do not turn. Therefore, a resisting torque is transmitted through wrap spring clutch 68 to collar 66. Thus, collar 66 and friction clutch member 80 tend to stay in a fixed position. As a result of this resistance, annulus 46 tends to rotate with respect to rotor 34, telescoping within rotor 34 so that teeth 50 eventually engage teeth 52. Once such engagement occurs torque is immediately and positively driven through hub 54 to the shafts 20 and 26. Due to the lead of the helical splines, teeth 50 and 52 are drawn into full engagement. This necessitates some relative rotation between input shaft 30 and output shaft 20. It is not desirable to permit the spring wrapup clutch 68 to slip so slippage is permitted at the conical interface between elements 80 and 46. This feature avoids the situation where the teeth only engage at their tips and cause unreliable coupling which could result in slippage or ratcheting. With teeth 50 and 52 fully engaged, the apparatus is configured as shown in FIG. 1.

It will now be assumed that the shaft 32 decelerates (alternatively shaft 22 may drift to a higher speed than shaft 32). Consequently, there can exist at shaft 22 a reverse torque, i.e., a torque in the counterclockwise direction when viewed from the input to output end). However, such a torque is not effectively transmitted through wrap spring clutch 68 since such a torque tends to wind it and decouple shoulder and eave 26B from collar 66. Consequently, clutch member 80 does not apply a restraining torque and merely rotates synchronously with annulus 46. As a result, the force applied by compression spring 88 and the force due to the action of the ramp-like back side of the teeth, is able to drive apart teeth 50 and 52 as annulus 46 rotates by its splines within the splines of rotor 34. As a result, teeth 50 and 52 disengage as shown in FIG. 3. This completes a cycle which may repeat as the torques change.

Referring to FIG. 5, a unit which is an alternate to that of FIG. 1 is illustrated in a longitudinal cross section. In this embodiment, hollow input shaft 100 has external splines and inner flange 102 with a shelf 105 supporting ball bearing 106. Flange 102 fits on hollow cylindrical casing 104 having at a portion adjacent flange 102 internal helical splines. Connected to a flange at the opposite end of casing 104 is a flanged sleeve 108 whose outer end supports and is encircled by ball bearing 110. Mounted against an internal shoulder within sleeve 108 is another ball bearing 112 held in place by internal snap rings 114 fitted within sleeve 108.

A washer-like cover 116 encircles hollow output shaft 118 whose outer end has external splines. Just within cover 116, shaft 118 supports retainer 120 and also its adjacent, previously mentioned, ball bearing 112. A spacer 122 separates ball bearings 112 and 124, all of which are mounted around the middle of output shaft 118 for the purpose of rotatably supporting casing 108. The inside end of shaft 118 flares into a bell-shaped end 118B connecting to the main part of shaft 118 at a flange 118A. Axle 126 centered within hollow shaft 118 has a bell-shaped outer end through which pin 128 is secured into the walls of shaft 118. The inside end of shaft 126 forms a hub 126A having external splines. Secured between bearing 124 and flange 118A by a pilot pin is cowl 130 having an inwardly projecting cylindrical wall ending in a lip which holds in place annular hub 132. Hub 132 has internal splines engaging external splines on the flared end of shaft 118. Contained between flange 118A and hub 132 is a wave-type, spring washer 135 which tends to urge member 132 to the right (toward the input end). Annular hub 132 has a plurality of radially aligned teeth 134 which are adjacent to teeth 136 in annulus 138. Annulus 138 has internal bevelled surface 138A and external helical splines engaging matching splines on the inside of housing 104.

Two snap rings 140 snap into an internal groove in annulus 138 to prevent retraction of flange 142A of spindle 142 out of annulus 138. The outer end of spindle 142 terminates in a threaded boss 142B onto which is mounted a nut 144 and washer 146. Contained between washer 146 and an inwardly projecting lip 100A of input shaft 100 is compression spring 148 which tends to drive spindle 142 and annulus 138 to the right.

A drag means is shown herein as a collar 150 having internal splines coupling with the external splines on the hub 126A. Encircling collar 150 is unidirectional clutch 152. Clutch 152 operates to transfer torque in one direction but freewheel in the other. Abutting to the right of clutch 152 is flanged collar 154 which is held against the clutch by means of three Belville-type, spring washer 156 also bearing against flange 142A. Encircling unidirectional clutch 152 is friction clutch 158 having an outer surface matching and engaging bevelled surface 138A. The left portion of clutch element 158 terminates in a narrowed neck portion coterminous with collar 150.

Referring to FIG. 6, an example is given of the unidirectional clutch 152 of FIG. 5. Clutch 152 includes an outer band 152A into which is fitted annular cylindrical body 152B. Body 152B fits over the internally splined collar 150. Underneath band 152A are three ramps 152C cut into body 152B. These ramps slant in the same rotational sense. The bottoms of ramps 152C open to cylindrical cavities 152D which each contain compression spring 162E covered by cylindrical plug 162F. Ball 162G in each of the ramps is adjacent to plug 162F so that spring 162E can drive ball 162G upwardly along ramp 152C to engage band 152A.

The operation of the apparatus of FIG. 6 can be understood by considering first a situation where collar 150 rotates counterclockwise with respect to band 152A. Since body 152B also turns counterclockwise, ball 162G tends to be driven inwardly in a direction to compress spring 162E. Consequently, relative rotation between body 152B and band 152A readily occurs. If now the rotation of collar 150 reverses (that is, clockwise with respect to band 152A), ball 162G tends to ride upwardly on ramp 152C. Consequently, ball 162G will wedge between ramp 152C and the inside surface of band 152A. Accordingly, band 152A and body 152B must rotate together.

Figure 8A:
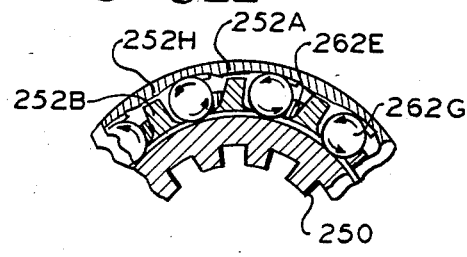
FIGS. 8A and 8B are fragmentary, transverse cross-sectional views of a roller clutch which may be employed in the apparatus of FIG. 5 as an alternate to the clutch shown in FIG. 6.
Figure 8B:
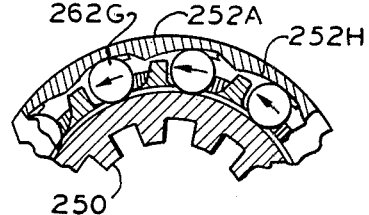

Referring to FIGS. 8A and 8B, an alternate unidirectional clutch is described which may be employed in the embodiment of FIG. 5. In these two Figures, components corresponding to that described in FIG. 6 bear a similar reference numeral, except that its hundreds digit is increased by one. Accordingly, internally splined collar 250 is shown adjacent to a clutch body 252B. Outer band 252A, however, contains the ramps 252H, instead of body 252B. Springs 262E mounted in body 252B urge cylindrical rollers 262G in a direction along ramps 252H to drive the rollers radially inward against collar 250. Such a roller clutch can be obtained from the Torrington Company, Torrington, Conn.

The operation of the unidirectional clutch of FIGS. 8A and 8B can be understood by considering first FIG. 8A wherein it is assumed that collar 250 tends to rotate clockwise with respect to band 250A. As a result, rollers 262G tend to be driven against springs 262E to reach a wider portion of ramp 252H providing more clearance. Consequently, rollers 262G are free to rotate and do not transfer torque. In the event that collar 250 tends to rotate counterclockwise with respect to band 252A as shown in FIG. 8B, the rollers 262G tend to be driven in the direction indicated by the arrow toward a narrow portion of ramps 252H. Consequently, rollers 262G are wedged between bands 252A and collar 250.

As a result, torque is readily transferred between collar 250 and band 252A.

Figure 7:
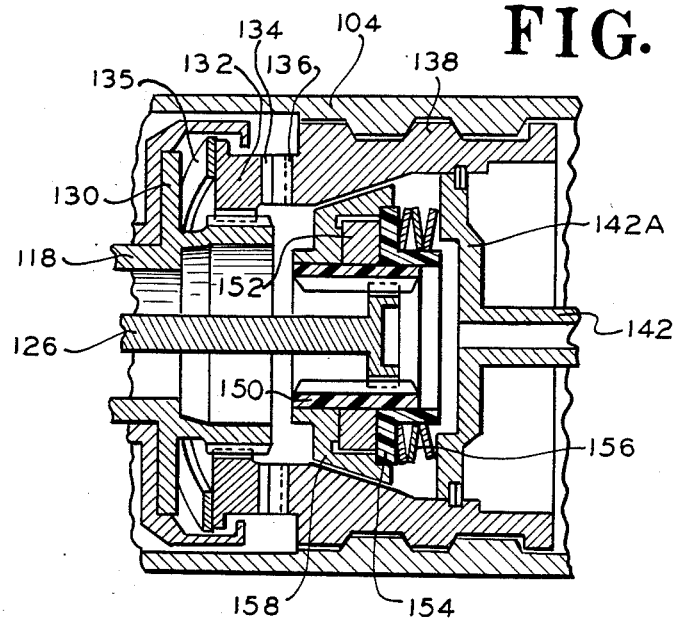
FIG. 7 is a detailed view of a portion of the apparatus of FIG. 5 showing components axially shifted during positive drive.

In order to facilitate an understanding of the principles associated with the apparatus of FIGS. 5–7, their operation will now be briefly described. It will be appreciated that the operation for the system substituting the roller clutch of FIGS. 8A and 8B will be identical, except for the specifics of the respective clutch operations, already described above. It is initially assumed that the clutch of FIG. 6 is quiescent and in the position illustrated. Initially, an input torque is applied to shaft 100 causes housing 104, as well as collar 108, to rotate within bearings 106 and 110. Since output shaft 118 is initially stationary, a resisting torque is applied through shaft 126 and collar 150 to unidirectional clutch 152. Therefore, a restraining torque is applied to annulus 138 through frictional element 158. As a result, relative rotation occurs between annulus 138 and housing 104, causing them to telescope until teeth 136 engage teeth 134 of hub 132. Therefore, positive coupling is created between input shaft 100 and output shaft 118. Also, in a manner similar to that described previously, after positive coupling is effected, the load on the teeth 136 is somewhat relieved by the torque applied through clutch 152 and frictional clutch element 158. Since relative slipping may occur at the bevelled surface 138A, and because of the unloading, the teeth 134 and 136 can come into appropriate alignment so they fully mesh.

In the event shaft 100 decelerates (or should shaft 118 rotate faster) a reverse torque is applied by shaft 118 to collar 150. However, clutch 152 is released for this reversed condition so that no torque is applied through frictional clutch element 158. Consequently, compression spring 148 moves shaft 142 and thus annulus 138 outwardly, rotating by its splines to separate teeth 134 and 136 as shown in FIG. 5.

It is to be appreciated that various modifications may be implemented with respect to the above described preferred embodiment. For example, while most of the components described herein are made of steel, in other embodiments aluminum or appropriately strong plastics or other materials can be used instead. Also, it will be appreciated, by comparing FIGS. 5 and 1, that the shape and relative placement of the various components can be altered. Also, various unidirectional clutches can be employed, including ratchets and other devices. Also, ball bearings, roller bearings or other types of bearings can be used in place of the various illustrated bearings. While various compression springs are shown, the urging can be performed by different elastomeric or other resilient devices. Also, the joints between the illustrated components can be formed by screwing, welding, riveting or by various other types of fastening techniques. Also, the number of splines and teeth illustrated herein may be varied, depending upon the application. Furthermore, the dimensions and shapes of various components can be altered, depending upon the desired strength, speed of operation, rigidity, reliability, temperature stability, etc.

Obviously, many modifications and variations of the present invention are possible in light of the above teachings. It is, therefore, to be understood that within the scope of the appended claims, the invention may be practiced otherwise than as specifically described.

What is claimed is:

1. A unit for transmitting a driving torque from an input to an output shaft in a given rotational sense, load torque of the same rotational sense at the output shaft being operable to cause it to freewheel, comprising:
    (a) a rotor arranged to be driven by said input shaft, the rotor including a member having a plurality of internal spiralled splines;
    (b) a hub coupled to said output shaft to rotate therewith;
    (c) a thrust means threadably and coaxially mounted on said rotor for running on said rotor and engaging said hub, said thrust means having complementary external splines engaging said internal splines;
    (d) a unidirectional torque coupler;
    (e) drag means coupled between said hub and said thrust means for transmitting torque to the latter in a rotational sense which is opposite to said given rotational sense, said drag means including frictional means serially connected with said unidirectional torque coupler for frictionally engaging said thrust means, the drag means being in engagement with an annulus coaxially mounted within said rotor, said annulus having a plurality of axially extending driving teeth for positively engaging and driving said hub; and
    (f) means for urging apart said thrust means and said hub so that, when torque is applied in a given direction through said members, the unidirectional torque coupler resists rotation of said annulus to cause the annulus to telescope and engage said output shaft, and when the load torque at said output shaft reverses from said direction, the unidirectional torque coupler ceases the resistance to rotation of said annulus, and the means for urging apart urges said annulus to disengage said output shaft.

2. A unit according to claim 1 wherein said hub comprises:
    a support shaft; and
    a toothed member coaxially and slidably mounted on said support shaft alongside said annulus, said toothed member having a plurality of driven teeth extending toward said driving teeth for engaging them when proximate.

3. A unit according to claim 2 wherein said hub further comprises:
    a spring means for urging said toothed member toward said annulus.

4. A unit according to claim 3 wherein said annulus has a bevelled inside surface converging in a direction toward said toothed member, said frictional means having a complementary externally bevelled surface for engaging the bevelled inside surface of said annulus, said thrust means further comprising:
    a resilient means coupled between said annulus and said frictional means for urging them together.

5. A unit according to claim 4 wherein said unidirectional torque coupler comprises a wrap spring clutch.

6. A unit according to claim 4 wherein said unidirectional torque coupler comprises a roller clutch.

7. A unit according to claim 4 wherein said drag means comprises:
    a collar rotatably mounted around said support shaft between said frictional means and said unidirectional torque coupler.

* * * * *